United States Patent
Perez

(10) Patent No.: US 11,316,701 B1
(45) Date of Patent: Apr. 26, 2022

(54) DECENTRALIZED SYSTEM FOR GENERATION AND DEPLOYMENT OF DIGITAL CERTIFICATES

(71) Applicant: ZT Group Int'l, Inc., Secaucus, NJ (US)

(72) Inventor: Oscar Alfredo Perez, Pflugerville, TX (US)

(73) Assignee: ZT Group Int'l, Inc., Secaucus, NJ (US)

( * ) Notice: Subject to any disclaimer, the term of this patent is extended or adjusted under 35 U.S.C. 154(b) by 151 days.

(21) Appl. No.: 16/660,401

(22) Filed: Oct. 22, 2019

(51) Int. Cl.
*H04L 9/32* (2006.01)
*H04L 9/08* (2006.01)

(52) U.S. Cl.
CPC .......... *H04L 9/3263* (2013.01); *H04L 9/0825* (2013.01); *H04L 9/0869* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 6,553,493 B1* | 4/2003 | Okumura | .............. | H04L 9/0897 |
| | | | | 713/168 |
| 6,959,382 B1* | 10/2005 | Kinnis | .................. | G06F 21/602 |
| | | | | 713/168 |
| 7,802,092 B1* | 9/2010 | Kelly | .................... | H04L 9/3263 |
| | | | | 713/156 |
| 9,660,978 B1* | 5/2017 | Truskovsky | .......... | H04L 9/3247 |
| 10,277,406 B1* | 4/2019 | Veladanda | ............ | H04L 9/0825 |
| 2006/0105740 A1* | 5/2006 | Puranik | .................. | H04L 51/38 |
| | | | | 455/410 |
| 2007/0005981 A1* | 1/2007 | Miyazawa | ............ | H04L 9/3268 |
| | | | | 713/176 |
| 2011/0145569 A1* | 6/2011 | Liu | ....................... | H04L 9/3263 |
| | | | | 713/158 |
| 2017/0012786 A1* | 1/2017 | Gallagher | ............... | H04L 9/321 |

FOREIGN PATENT DOCUMENTS

WO    WO-2019010049 A1 *  1/2019  .......... H04W 12/069

* cited by examiner

*Primary Examiner* — Benjamin E Lanier
(74) *Attorney, Agent, or Firm* — Dergosits & Noah LLP; Todd A. Noah

(57) ABSTRACT

A decentralized certificate module generates a unique key pair. The decentralized certificate module creates a certificate signing request (CSR) based at least on a public key of the unique key pair. The decentralized certificate module signs the CSR with pre-installed system data to generate a signed trust certificate. The decentralized certificate module initiates a secure communication that includes the signed trust certificate.

17 Claims, 6 Drawing Sheets

US 11,316,701 B1

DECENTRALIZED SYSTEM FOR GENERATION AND DEPLOYMENT OF DIGITAL CERTIFICATES

TECHNICAL FIELD

The present disclosure relates generally to digital certificates and more specifically to decentralized generation of signed trust certificates.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional systems, Certification Authorities are implemented as centralized certification control systems in which a private key remains secret and secured. This conventional centralization poses a challenge to end-entities that must have a trust certificate immediately upon powering-on for a first use. Conventional centralization forces an end-entity to execute a process of sending Certificate Signing Requests to a Certification Authority and waiting for the Certification Authority to return a signed certificate before the end-entity can begin secure and trustworthy communications with other end-entities.

In cryptography, a digital certificate is an electronic document used to prove the ownership of a public key. Digital certificates are commonly used for authenticating the identity of an end-entity, such as a server or a client. A Certification Authority ("CA") issues the digital certificate that are deemed as trustworthy to end-entities.

When a client application initiates a connection to a server, a client-server handshake is performed where the server provides the client with a digital certificate that the client can verify before fully establishing a client-server connection. During the client-server handshake, the server can also request that the client provide with digital certificate thereby allowing the server and the client to mutually authenticate each other.

Furthermore, if the digital certificate is provided by an end-entity was issued by a root Certification Authority, then the end-entity will only have to verify the authenticity of the root Certification Authority before establishing the connection. However, if the digital certificate is provided by an intermediate Certification Authority, then the end-entity must verify the authenticity of all intermediate Certification Authorities in a Certification Authority chain that leads back to the single trusted root Certification Authority. If the end-entity is unable to verify the authenticity of only one of the Certification Authorities in the entire chain, the end-entity must drop the connection due to security and privacy concerns.

BRIEF SUMMARY

The disclosed embodiments generally include a method for decentralizing the generation of signed trust certificates. The method may include generating a unique key pair, creating a certificate signing request (CSR) based at least on a public key of the unique key pair, signing the CSR with pre-installed system data to generate a signed trust certificate and initiating a secure communication that includes the signed trust certificate.

The disclosed embodiments may also include a computer program product for decentralizing the generation of signed trust certificates. The computer program product may include computer-readable program code to be executed by one or more processors when retrieved from a non-transitory computer-readable medium, the program code including at least one instruction to: generate a unique key pair for a device that belongs to a set of devices, create a CSR based at least on a public key of the unique key pair, sign the CSR with pre-installed device data to generate a signed trust certificate and initiate a secure communication to a respective device, the secure communication including the signed trust certificate.

The disclosed embodiments may also include a system for decentralizing the generation of signed trust certificates. The system may include one or more processors; and a non-transitory computer readable medium storing a plurality of instructions, which when executed, cause the one or more processors to: generate a unique key pair for the system, wherein the system belongs to a set of systems, create a CSR based at least on a public key of the unique key pair, sign the CSR with pre-installed system data to generate a signed trust certificate and initiate a secure communication to a respective system, the secure communication including the signed trust certificate.

The disclosed embodiments may also include a method, a computer program product and a system for generating and installing system data into one or more devices in a set of devices. Each respect device in the set of devices receives similar Certification Authority data, but different seed data. Such installation may further include generating and uploading software instructions into each respective device, wherein the software instructions when executed at a respective device performs one or more operations disclosed herein for generating a signed trust certificate.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
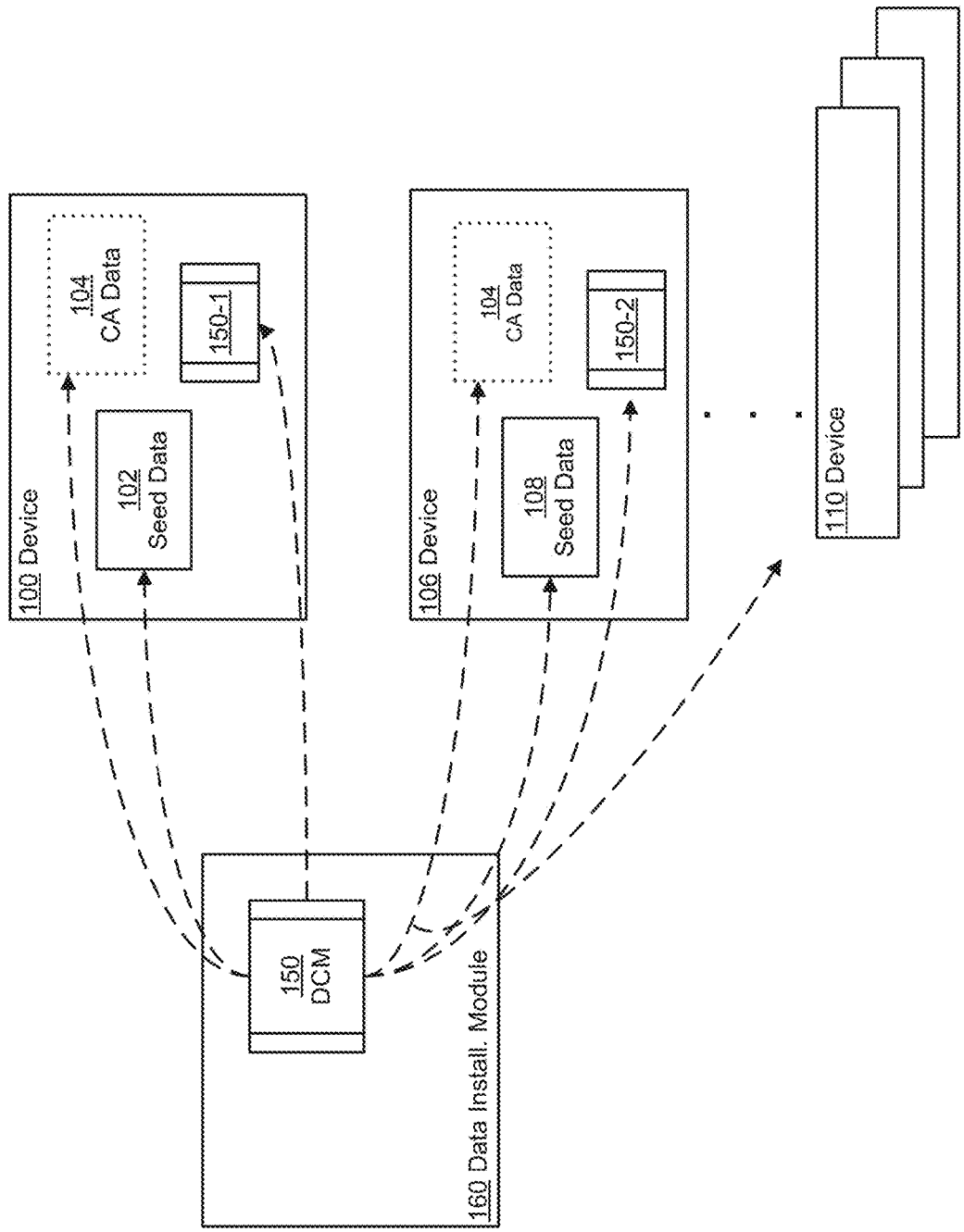
FIG. 1 is a high-level diagram of pre-installing seed data and Certificate Authority data in devices that belong to a set of devices, in an embodiment.

In accordance with embodiments described herein, there are provided methods, systems and computer program products to decentralize the generation of signed certificates to thereby allow end-entities to immediately begin secure and trustworthy communications "out-of-the-box." According to such embodiments, a decentralized certificate module generates a unique key pair for the system (or device), wherein the system belongs to a set of systems. The decentralized certificate module creates a Certificate Signing Request based at least on a public key of the unique key pair. The decentralized certificate module signs the Certificate Signing Request with pre-installed system data to generate a signed trust certificate, and the decentralized certificate module initiates a secure communication to another respective system, wherein the secure communication includes the signed trust certificate. As a result of decentralizing the signing of certificates in accordance with embodiments described herein, end-entities can generate an "out-of-the-box" signed certificate that can be trusted by client applications without requiring that a system administrator or an end-user first invest the time and effort to request a signed certificate from an external Certification Authority implemented in a conventional centralized control system. Therefore, by generating a signed trust certificate with pre-installed system data, embodiments herein overcome the challenges posed by centralized conventional Certification Authorities that force an end-entity to execute a process of sending out Certificate Signing Requests over to a conventional Certification Authority and then waiting for the Certification Authority to return a signed certificate before the end-entity can begin communications with other end-entities.

It is understood that "out-of-the-box" as used herein may refer to a moment coincident to when a device, system and computer program product is powered-on for the first time (i.e. receives power for the first time) to initiate a first use of the device, system and computer program product. In addition, it is understood that the various types of pre-installed data as described herein may refer to any type of data used by a device, system and computer program product in which the data is provided to (i.e. made available to, loaded into) the device, system and computer program product prior to the first time it is powered-on for a first use.

Any of the embodiments described herein may be used alone or together with one another in any combination. The one or more implementations encompassed within this specification may also include embodiments that are only partially mentioned or alluded to or are not mentioned or alluded to at all in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Some embodiments described herein may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments may also be practiced in distributed computing environments where tasks are performed by remote processing devices that are linked through a communications network. In a distributed computing environment, program modules may be located in both local and remote computer storage media including memory storage devices.

FIG. 1 is a high-level diagram of pre-installing seed data and Certificate Authority (CA) data in devices that belong to a set of devices, in an embodiment.

As shown in FIG. 1, a data installation module 160 includes a decentralized certificate module 150 for loading (i.e. installing) data into devices 100, 106 . . . 110 . . . that belong to a set of devices. The set of devices 100, 106 . . . 110 . . . can include any number of devices. It is understood that the loading of the data may occur before each device 100, 106 . . . 110 . . . is initially powered-on for a first use.

The decentralized certificate module 150 may load seed data 102 and Certificate Authority data 104 into the device 100 before it is powered-on for a first use. The decentralized certificate module 150 may also generate and load a version of the decentralized certificate module 150-1 ("device DCM") onto the device 100, whereby the device DCM 150-1 initiates, manages and controls the creation, use and storage of a signed trust certificate for the device 100. The decentralized certificate module 150 may also generate and load an instance of a Certificate Authority module onto the device 100. In addition, the decentralized certificate module 150 may load seed data 108 and Certificate Authority data 104 into the device 106 before it is powered-on for a first use. The decentralized certificate module 150 may also generate and load another instance of the device DCM 150-2 onto device 106, whereby the device DCM 150-2 initiates, manages and controls the creation, use and storage of a signed trust certificate for the device 106. The decentralized certificate module 150 may also generate and load another instance of the Certificate Authority module onto the device 106. While the seed data 102, 104 generated by the decentralized certificate module 150 are unique for each respective device 100, 106 . . . 110 . . . in the set of devices, the decentralized certificate module 150 loads copies of the same (i.e. matching) CA data 104 into each respective device 100, 106 . . . 110 . . . . It is understood that described embodiments herein may include the development and generation of one or more portions and versions of the decentralized certificate module 150, 150-1, 150-2 to perform the various actions, steps and operations described herein. The decentralized certificate module 150, 150-1, 150-2 can be a software module(s) that resides in any portion (or portions) of a device(s), system(s), or computer program product(s). In addition, the decentralized certificate module 150, 150-1, 150-2 can (or any portion of the decentralized certificate module) can be distributed across devices, systems, or computer program products. In some embodiments, as in FIG. 1, a portion(s) of the decentralized certificate module 150 pre-installs data into a device(s), system(s), or computer program product(s).

Figure 2:
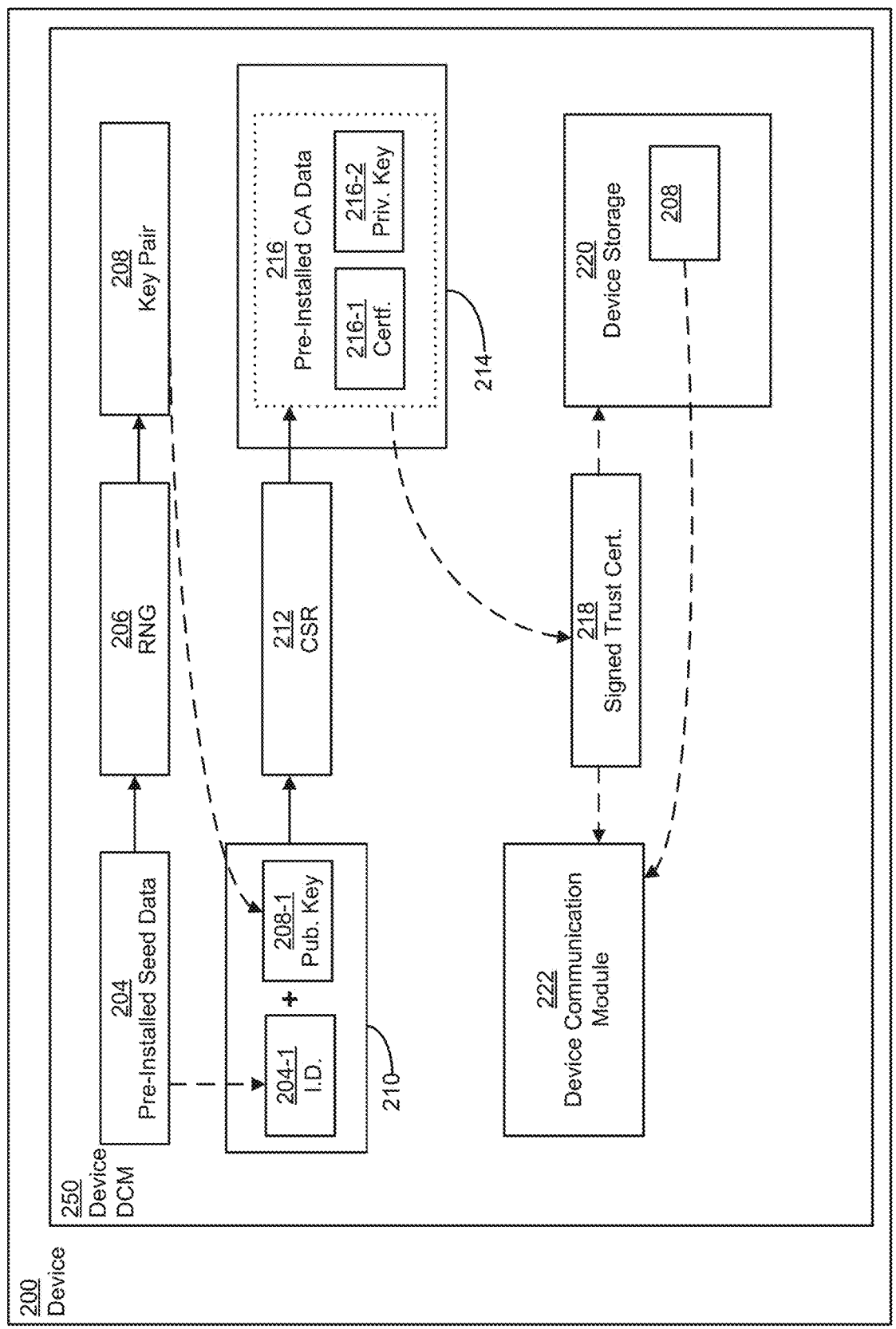
FIG. 2 is a high-level diagram of a decentralized certificate module of a device generating a signed trust certificate, in an embodiment.

FIG. 2 is a high-level diagram of a decentralized certificate module of a device generating a signed trust certificate, in an embodiment. As shown in FIG. 2, a device 200 includes a portion(s) of the decentralized certificate module 250 ("device DCM 250") that initiates, manages and controls the creation, use and storage of a signed trust certificate within the device 200. The device 200 may include pre-installed data, such as seed data 204 and Certificate Authority data 216. The device DCM 250 applies a random number generator 206 to the seed data 204 in order to generate a unique public/private key pair 208 for the device 200. The device DCM 250 places the key pair 208 in storage. The device DCM 250 sends a public key 208-1 from the key pair 208 and a unique device identifier 204-1 included in the seed data 204 to a signing request module 210. The signing request module 210 uses the public key 208-1 and the device identifier 204-1 to generate a Certificate Signing Request 212. The Certificate Signing Request 212 includes the public key 208-1 and additional information identifying the device 200, whereby the identifying information may be signed by pre-installed CA private key 216-2.

A Certificate Authority (CA) module 214 may include a pre-installed CA certificate 216-1 and a pre-installed CA private key 216-2. The Certificate Authority (CA) module 214 receives and signs the Certificate Signing Request 212 with the pre-installed CA private key 216-2 to generate a signed trust certificate 218 without having to initially communicate with a conventional external Certificate Authority. The signed trust certificate 218 includes the digital signature from the CA module 214, data from the Certificate Signing Request 212 (i.e. public key 208-1 and identity information of the device 200) and the identity information of CA module 214.

The device DCM 250 places a copy of the signed trust certificate 218 in storage and sends the signed trust certificate 218 to the device's 200 communication module 222 which can include a copy of the signed trust certificate 218 in communications transmitted from the device 200 coincident to the device's 200 first use. The communication module 222 further begins to use the public/private key pair 208 and signed trust certificate 218 to establish secure communications with other devices. If CA certificate 216-1 is not a Root CA, then the communication module 222 includes the list of all the CA certificates in the trust chain leading to a single Root CA in order to allow other devices to check the authenticity of public key 208-1 by verifying that signed trust certificate 218 was digitally signed by a Certification Authority that is in their trust chains. If CA certificate 216-1 is a Root CA, then other devices must include a copy of CA certificate 216-1 in their certificate stores to be able to verify the authenticity of public key 208-1.

Figure 3:
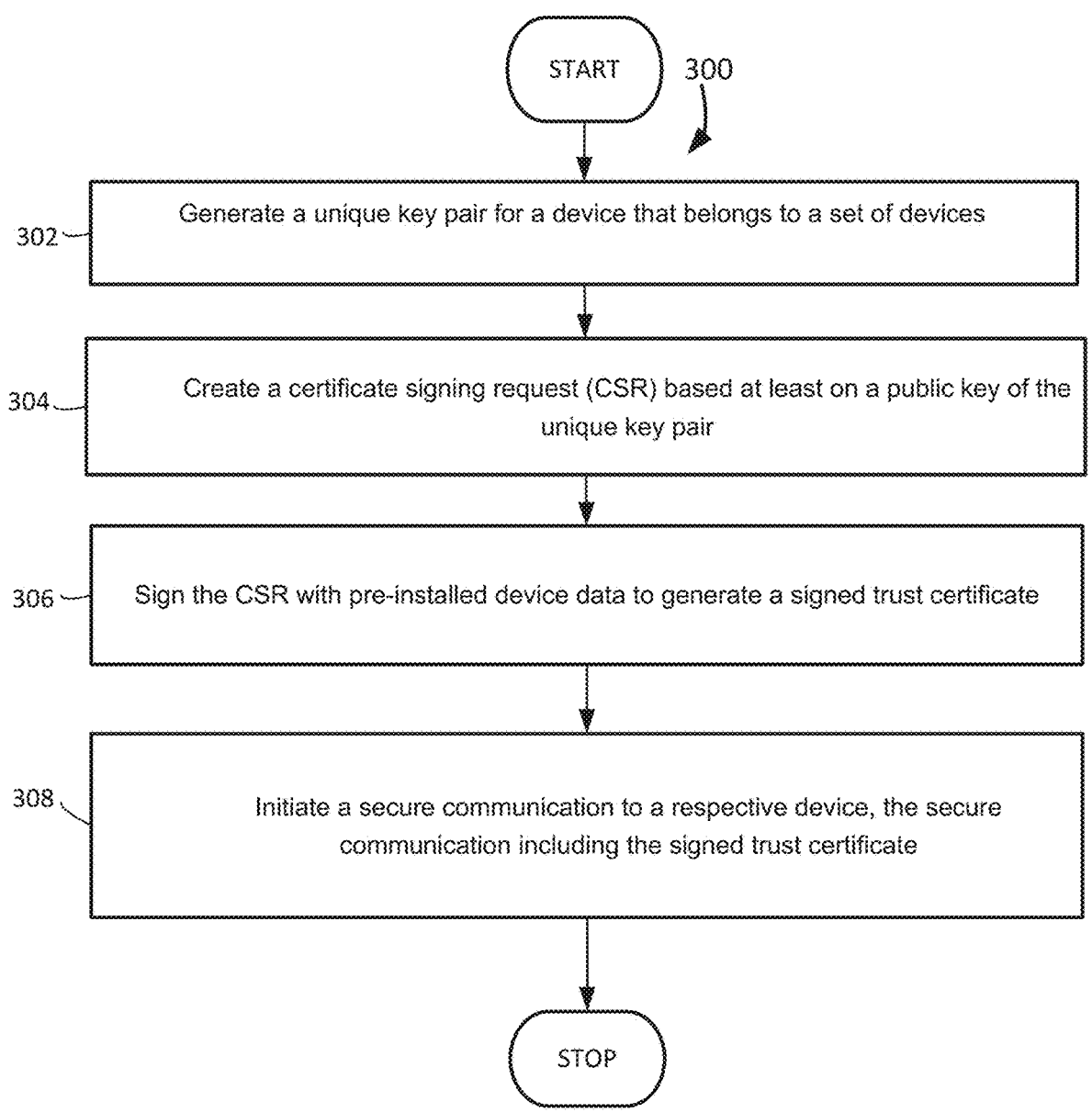
FIG. 3 is an operational flow diagram illustrating a high-level overview of a method for decentralized signing of a trust certificate, in an embodiment.

FIG. 3 is an operational flow diagram 300 illustrating a high-level overview of a method for decentralized signing of a trust certificate, in an embodiment.

At step 302, the decentralized certificate module generates a unique key pair for a device that belongs to a set of devices, wherein each respective device belongs to the set on account of having similar pre-installed data. In some embodiments, since each respective device may have similar Certification Authority data, each respective device may generate its own signed trust certificate to initiate trustworthy communications with other devices that belong to the set of devices—without having to first contact an external conventional Certification Authority.

In some embodiments, the device can be a Baseboard Management Controller, a Service Processor for a server, a hardware device that allows a system administrator to remotely monitor and control the device. In another example, the device can be an end-entity that is an Internet-of-Things (IoT) device or part of an IoT system. An example of an IoT device may be a smart security camera, a smart speaker, or a smart home appliance.

In some embodiments, prior to step 302, the decentralized certificate module installs, in each respective device in the set of devices, a copy of the same Certification Authority certificate and a copy of the same Certification Authority private key, for use by each respective device to generate an out-of-the-box signed trust certificate. Each respective device in the set of devices may also have a portion of the decentralized certificate module loaded onto the respective device to initiate and manage the out-of-the-box generation of a signed trust certificate for the respective device.

At step 304, the decentralized certificate module creates a Certificate Signing Request (CSR) based at least on a public key of the unique key pair. The CSR may also be based on a unique device identifier that was pre-installed into the device.

At step 306, the decentralized certificate module signs the CSR with pre-installed device data to generate a signed trust certificate. The decentralized certificate module thereby signs the Certificate Signing Request out-of-the-box without having to send a request to a conventional centralized Certification Authority. The decentralized certificate module may store the signed trust certificate and the unique key pair in a portion of device storage (such as persistent storage) that can retain the signed trust certificate and the unique key pair when the device is powered off. The signed trust certificate may remain in storage until the signed trust certificate is revoked by a system administrator or by an end-user with administration privileges on the device in which the signed trust certificate is stored.

At step 308, the decentralized certificate module initiates a secure communication to a respective device, the secure communication including the signed trust certificate. For example, the secure communication may be sent to one of the other respective devices that belongs to the set of devices.

Figure 4:
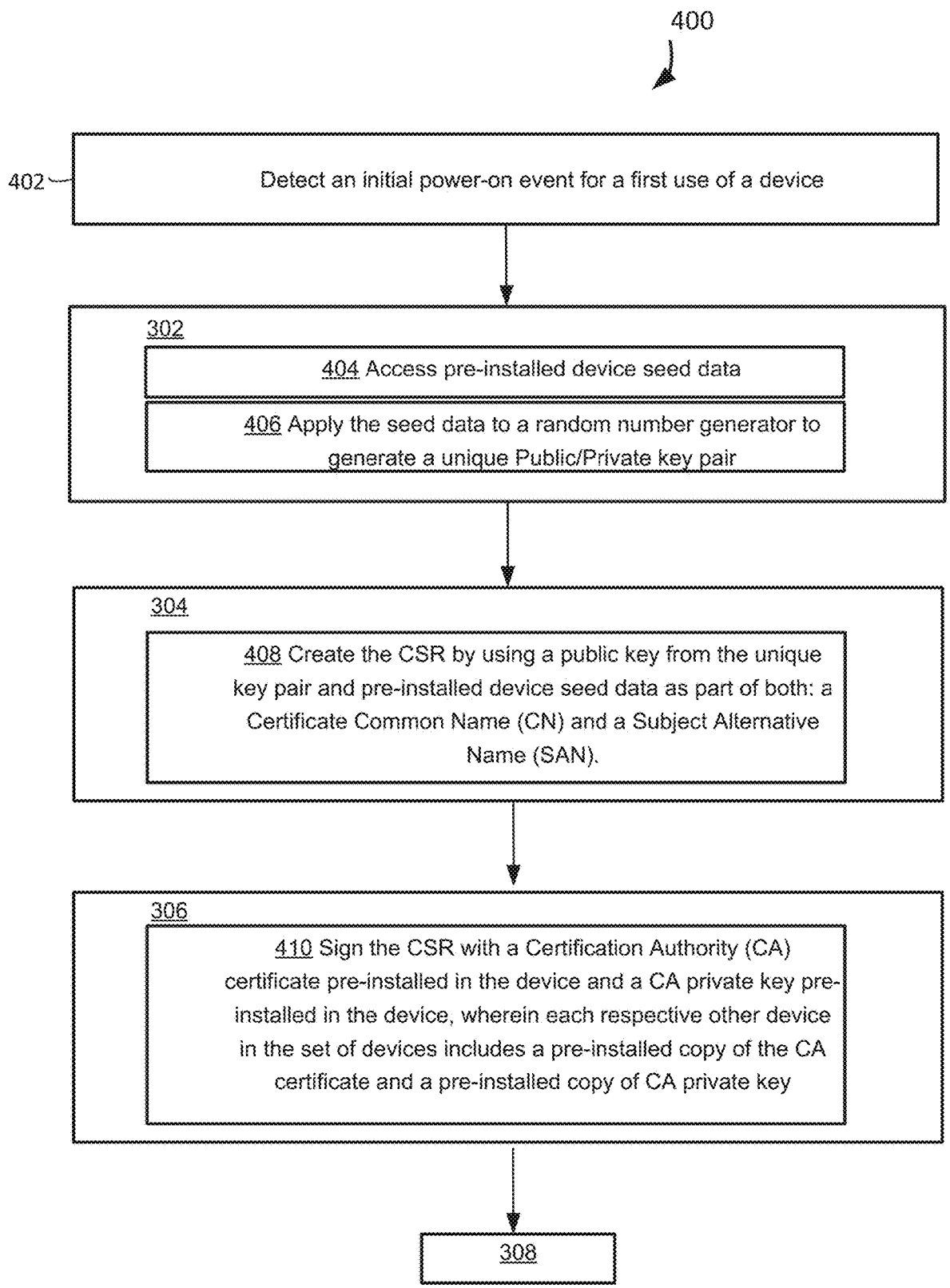
FIG. 4 is an operational flow diagram illustrating a high-level overview of a method for decentralized signing of a trust certificate, in an embodiment.

FIG. 4 is an operational flow diagram 400 illustrating a high-level overview of a method for decentralized signing of a trust certificate, in an embodiment.

At step 402, the decentralized certificate module detects an initial power-on event for a first use of the device. For example, an initial power-on event may occur when the device has left the manufacturer and an end-user has begun to use the device by providing a power supply to the device.

At step 404, the decentralized certificate module accesses pre-installed device seed data. The device contains a pre-installed unique device identifier and one or more bytes of random data. The pre-installed device seed data may be stored in Cryptographic Processor/Co-Processor, in non-volatile memory or in electrically erasable programmable read-only memory (EEPROM).

At step 406, the decentralized certificate module applies the seed data to a random number generator to generate a unique Public/Private key pair. The unique Public/Private key pair is based on the device's unique device identifier includes in the seed data and is thereby associated only with the device at which it was generated. The public key from the Public/Private key pair is available to any other device that is or will communicate with the device.

At step 408, the decentralized certificate module creates a Certificate Signing Request by using a public key from the unique key pair and pre-installed device seed data as part of both: a Certificate Common Name (CN) and a Subject Alternative Name (SAN). For added flexibility, each device in the set of devices may include host names and I.P. addresses to the SAN.

At step 410, the decentralized certificate module signs the Certificate Signing Request (CSR) with a Certification Authority (CA) certificate that was pre-installed in the device and a CA private key that was pre-installed in the device, wherein each respective other device in the set of devices have a pre-installed copy of the CA certificate and a pre-installed copy of CA private key. The signed trust certificate is generated based on the signing of the CSR with the CA certificate and the CA private key. The validity of this newly-generated signed trust certificate may be predefined using a fixed date, a fixed number of years since the date of generation. In another example, the validity may match the validity of the CA certificate used to generate the signed trust certificate.

System Overview

Figure 5:
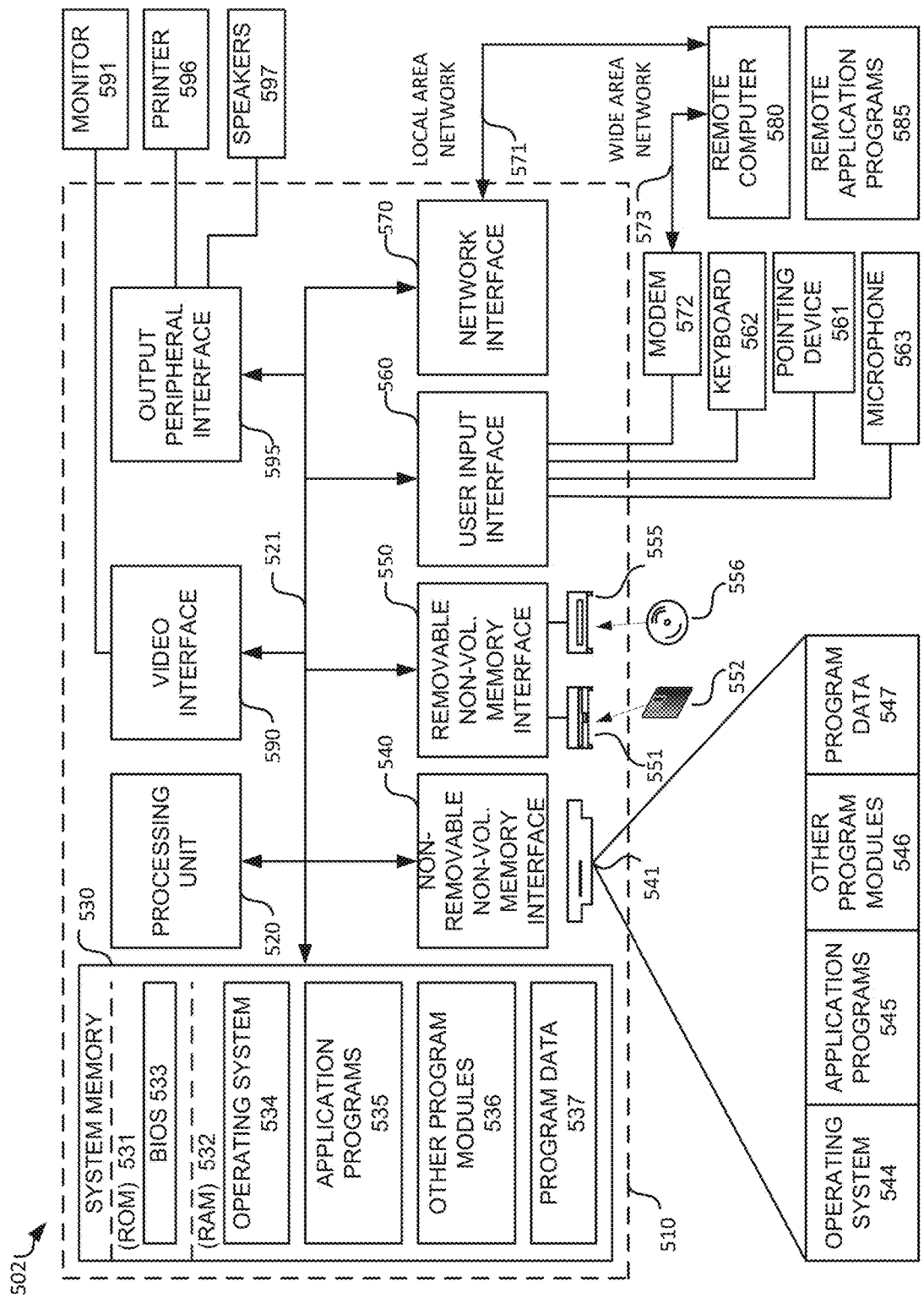
FIG. 5 shows a diagram of an example computing system that may be used with some embodiments.

Referring to FIG. 5, the computing system 502 may include, but are not limited to, a processing unit 520 having one or more processing cores, a system memory 530, and a system bus 521 that couples various system components including the system memory 530 to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 502 typically includes a variety of computer program product. Computer program product can be any available media that can be accessed by computing system 502 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 502. Communication media typically embodies computer readable instructions, data structures, or program modules.

The system memory 530 may include computer storage media in the form of volatile and/or nonvolatile memory such as read only memory (ROM) 531 and random access memory (RAM) 532. A basic input/output system (BIOS) 533, containing the basic routines that help to transfer information between elements within computing system 502, such as during start-up, is typically stored in ROM 531. RAM 532 typically contains data and/or program modules that are immediately accessible to and/or presently being operated on by processing unit 520. By way of example, and not limitation, FIG. 5 also illustrates operating system 534, application programs 535, other program modules 536, and program data 537.

The computing system 502 may also include other removable/non-removable volatile/nonvolatile computer storage media. By way of example only, FIG. 5 also illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computing system 502. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. The operating system 544, the application programs 545, the other program modules 546, and the program data 547 are given different numeric identification here to illustrate that, at a minimum, they are different copies.

A user may enter commands and information into the computing system 502 through input devices such as a keyboard 562, a microphone 563, and a pointing device 561, such as a mouse, trackball or touch pad or touch screen. Other input devices (not shown) may include a joystick, game pad, scanner, or the like. These and other input devices are often connected to the processing unit 520 through a user input interface 560 that is coupled with the system bus 521, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 590.

The computing system 502 may operate in a networked environment using logical connections to one or more remote computers, such as a remote computer 580. The remote computer 580 may be a personal computer, a handheld device, a server, a router, a network PC, a peer device or other common network node, and typically includes many or all of the elements described above relative to the computing system 502. The logical connections depicted in FIG. 5 includes a local area network (LAN) 571 and a wide area network (WAN) 573, but may also include other networks. Such networking environments are commonplace in offices, enterprise-wide computer networks, intranets and the Internet.

When used in a LAN networking environment, the computing system 502 may be connected to the LAN 571 through a network interface or adapter 570. When used in a WAN networking environment, the computing system 502 typically includes a modem 572 or other means for establishing communications over the WAN 573, such as the Internet. The modem 572, which may be internal or external, may be connected to the system bus 521 via the user-input interface 560, or other appropriate mechanism. In a networked environment, program modules depicted relative to the computing system 502, or portions thereof, may be stored in a remote memory storage device. By way of example, and not limitation, FIG. 5 illustrates remote application programs 585 as residing on remote computer 580. It will be appreciated that the network connections shown are exemplary and other means of establishing a communications link between the computers may be used.

It should be noted that some embodiments described herein may be carried out on a computing system such as that described with respect to FIG. 5. However, some embodiments may be carried out on a server, a computer devoted to message handling, handheld devices, or on a distributed system in which different portions of the present design may be carried out on different parts of the distributed computing system.

Another device that may be coupled with the system bus 521 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 572 may employ a Wireless Application Protocol (WAP) to establish a wireless communication channel. The communication module 572 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 6:
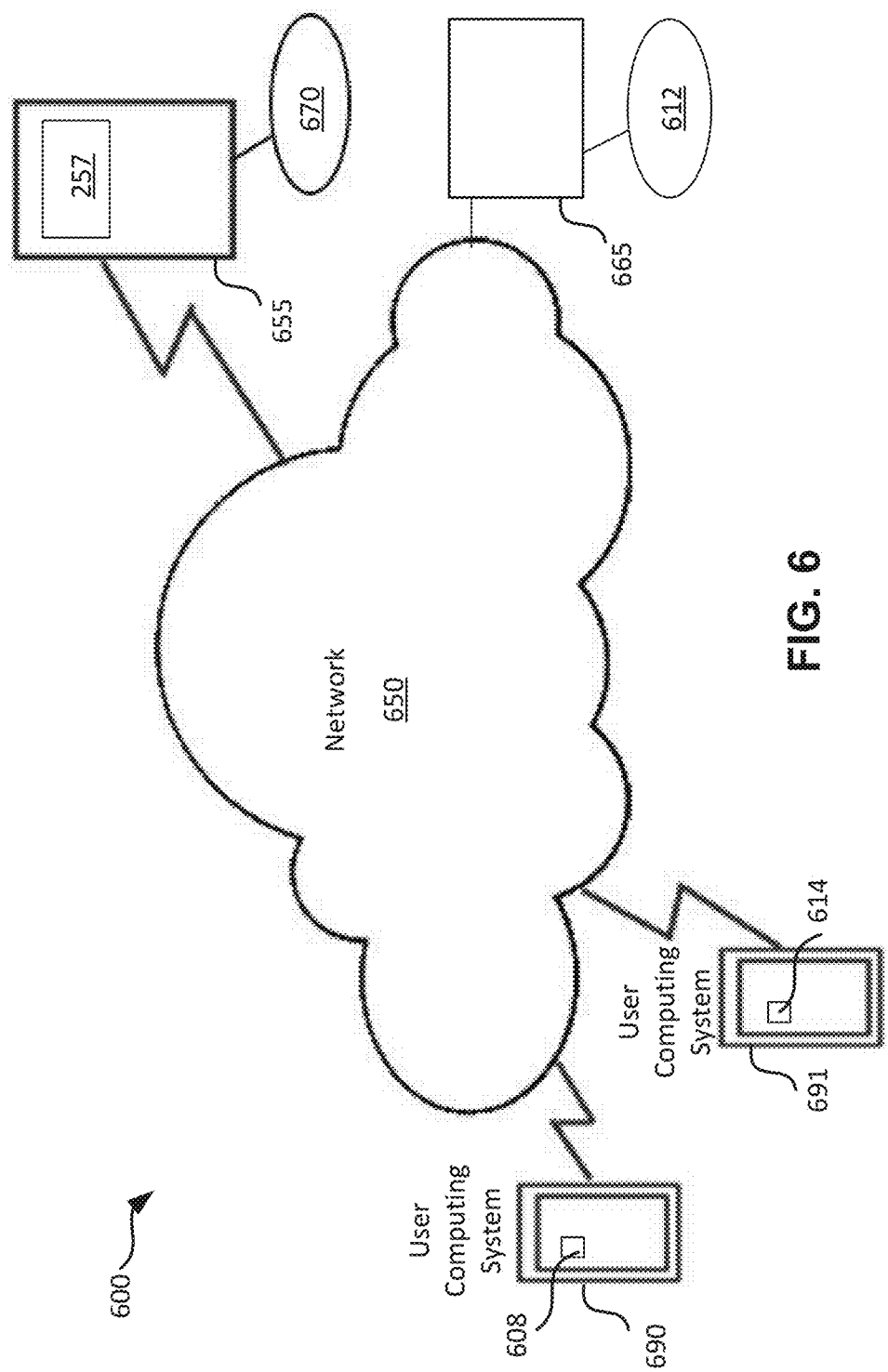
FIG. 6 shows a diagram of an example network environment that may be used with some embodiments.

FIG. 6 shows a diagram of an example network environment that may be used with some of the described embodiments. Network environment 620 includes computing systems 690 and 691. One or more of the computing systems 690 and 691 may be a mobile computing system that may include the decentralized certificate module. The computing systems 690 and 691 may be connected to the network 650 via a cellular connection or via a Wi-Fi router (not shown). The network 650 may be the Internet. The computing systems 690 and 691 may be coupled with server computing systems 655 and 665 via the network 650. The server computing systems 655 and 665 may also include the decentralized certificate module.

Each of the computing systems 690 and 691 may include an application module such as module 608 or 614. For example, a user (e.g., a developer) may use the computing system 690 and the application module 608 to connect to and communicate with the server computing system 655 and log into application 657.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
generating a unique key pair for a device that belongs to a set of devices;
creating a certificate signing request (CSR) based at least on a public key of the unique key pair;
generating a signed trust certificate on the device by signing the CSR using a certificate authority module pre-installed on the device with pre-installed device data and including the signed CSR in the signed trust certificate; and
initiating a secure communication by the device to a respective device from the set of devices, the secure communication including the signed trust certificate,
wherein the steps of generating the unique key pair, creating the CSR, signing the CSR and initiating the secure communication occur in response to an initial power-on event for a first use of the device.

2. The method of claim 1, wherein generating a unique key pair comprises:
accessing pre-installed device seed data; and
applying the seed data to a random number generator to generate a unique Public/Private key pair.

3. The method of claim 2, wherein the pre-installed device seed data comprises a unique device identifier pre-installed in the device and one or more bytes of random data pre-installed in the device.

4. The method of claim 1, wherein creating a CSR based at least on a public key of the unique key pair comprises creating the CSR by using a public key from the unique key pair and pre-installed device seed data as part of both a Certificate Common Name (CN) and a Subject Alternative Name (SAN).

5. The method of claim 1, wherein signing the CSR with pre-installed device data to generate a signed trust certificate comprises signing the CSR with a Certification Authority (CA) private key, wherein a CA certificate is pre-installed in the device and the CA private key is also pre-installed in the device, and wherein each respective other device in the set of devices includes a pre-installed copy of the CA certificate and a pre-installed copy of the same CA private key.

6. The method of claim 5, further comprising:
the CA private key and the CA certificate being pre-installed in the device and the respective other device prior to the generating the unique key pair and the creating the CSR.

7. The method of claim 1, further comprising storing, upon generating the signed trust certificate, the signed trust certificate and the unique key pair in a portion of device storage that retains the signed trust certificate and the unique key pair when the device is powered off.

8. A computer program product comprising a non-transitory computer-readable medium having a computer-readable program code embodied therein to be executed by one or more processors, the program code including instructions to:
generate a unique key pair for a device that belongs to a set of devices;
create a certificate signing request (CSR) based at least on a public key of the unique key pair;
generate a signed trust certificate on the device by signing the CSR using a certificate authority module pre-installed on the device with pre-installed device data and include the signed CSR in the signed trust certificate; and
initiate a secure communication to a respective device from the set of devices, the secure communication including the signed trust certificate,
wherein the instructions to generate the unique key pair, create the CSR, sign the CSR and initiate the secure communication are executed in response to detecting an initial power-on event for a first use of the device.

9. The computer program product of claim 8, wherein generating a unique key pair comprises accessing pre-installed device seed data and applying the seed data to a random number generator to generate a unique Public/Private key pair.

10. The computer program product of claim 9, wherein the pre-installed device seed data comprises a unique device identifier pre-installed in the device and one or more bytes of random data pre-installed in the device.

11. The computer program product of claim 8, wherein creating a CSR based at least on a public key of the unique key pair comprises creating the CSR by using a public key from the unique key pair and pre-installed device seed data as part of both: a Certificate Common Name (CN) and a Subject Alternative Name (SAN).

12. The computer program product of claim 8, wherein signing the CSR with pre-installed device data to generate a signed trust certificate comprises signing the CSR with a CA private key, wherein a Certification Authority (CA) certificate is pre-installed in the device and the CA private key is also pre-installed in the device, wherein each respective other device in the set of devices includes a pre-installed copy of the same CA certificate and a pre-installed copy of the same CA private key.

13. The computer program product of claim 8, wherein the program code includes further instructions to store the signed trust certificate and the unique key pair in a portion of device storage that retains the signed trust certificate and the unique key pair when the device is powered off.

14. A system comprising:
one or more processors; and
a non-transitory computer readable medium storing a plurality of instructions, which when executed, cause the one or more processors to:
generate a unique key pair for the system, wherein the system belongs to a set of systems;
create a certificate signing request (CSR) based at least on a public key of the unique key pair;
generate a signed trust certificate on the system by signing the CSR using a certificate authority module pre-installed on the system with pre-installed system data and include the signed CRS in the signed trust certificate; and
initiate a secure communication by the system to a respective system from the set of systems, the secure communication including the signed trust certificate,
wherein the instructions to generate the unique key pair, create the CSR, sign the CSR and initiate the secure communication are executed in response to detecting an initial power-on event for a first use of the device.

15. The system of claim 14, wherein the plurality of instructions to generate a unique key pair further cause the one or more processors to:
access pre-installed system seed data; and
apply the seed data to a random number generator to generate a unique Public/Private key pair.

16. The system of claim 14, wherein the plurality of instructions to create a CSR based at least on a public key of the unique key pair further cause the one or more processors to create the CSR by using a public key from the unique key pair and pre-installed system seed data as part of both a Certificate Common Name (CN) and a Subject Alternative Name (SAN).

17. The system of claim 14, wherein the plurality of instructions to sign the CSR with pre-installed system data to generate a signed trust certificate further cause the one or more processors to:
sign the CSR with a CA private key, wherein a Certification Authority (CA) certificate is pre-installed in the device and the CA private key is also pre-installed in the system, wherein each respective other system in the set of systems includes a pre-installed copy of the same CA certificate and a pre-installed copy of the same CA private key; and
store the signed trust certificate and the unique key pair in a system storage that retains the signed trust certificate and the unique key pair when the system is powered off.

* * * * *